June 13, 1939.     C. BRYAN     2,162,419
MOLD CONVEYER
Filed March 4, 1938      4 Sheets-Sheet 1
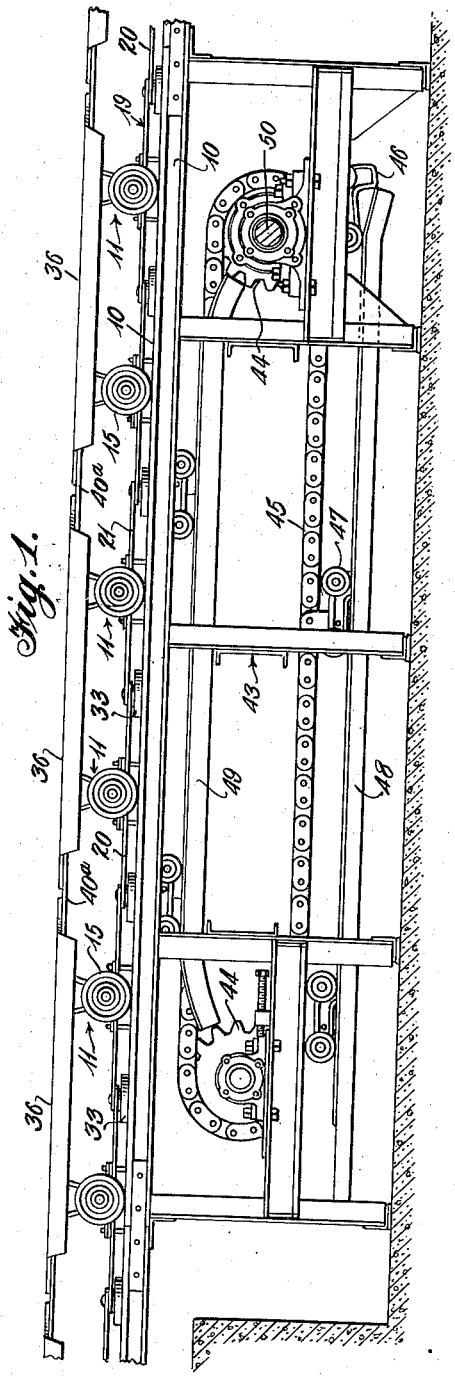
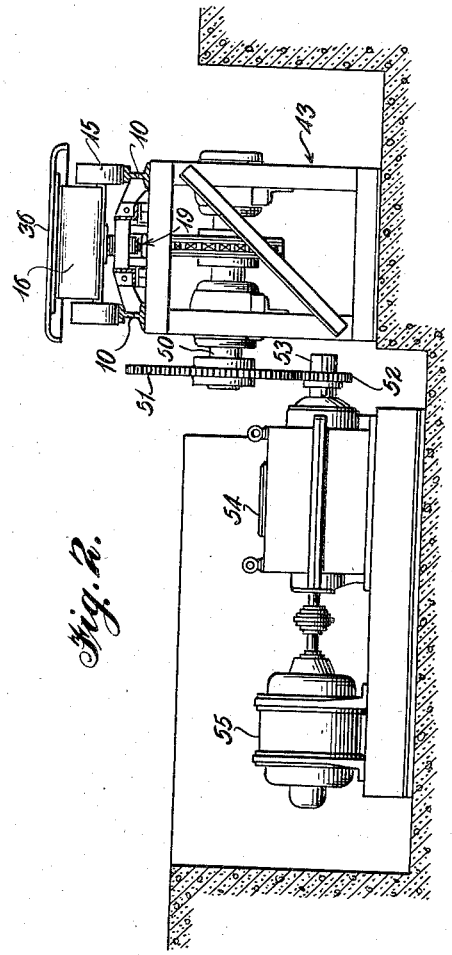
Inventor
*Clare Bryan*
By L. Donald Myers
Attorney June 13, 1939.　　　　C. BRYAN　　　　2,162,419
MOLD CONVEYER
Filed March 4, 1938　　　4 Sheets-Sheet 2
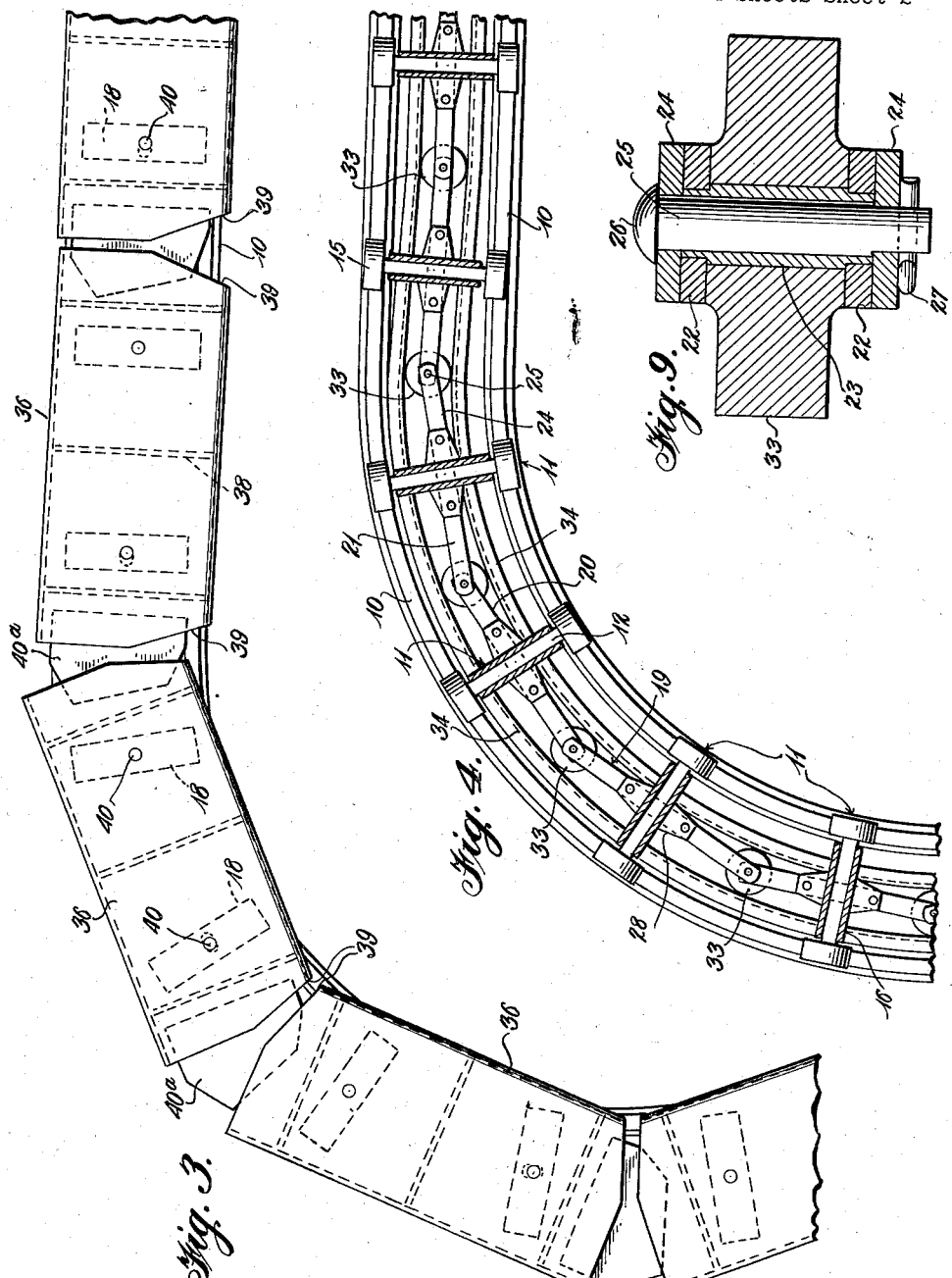
Inventor
*Clare Bryan*
By *L. Donald Myers*
Attorney

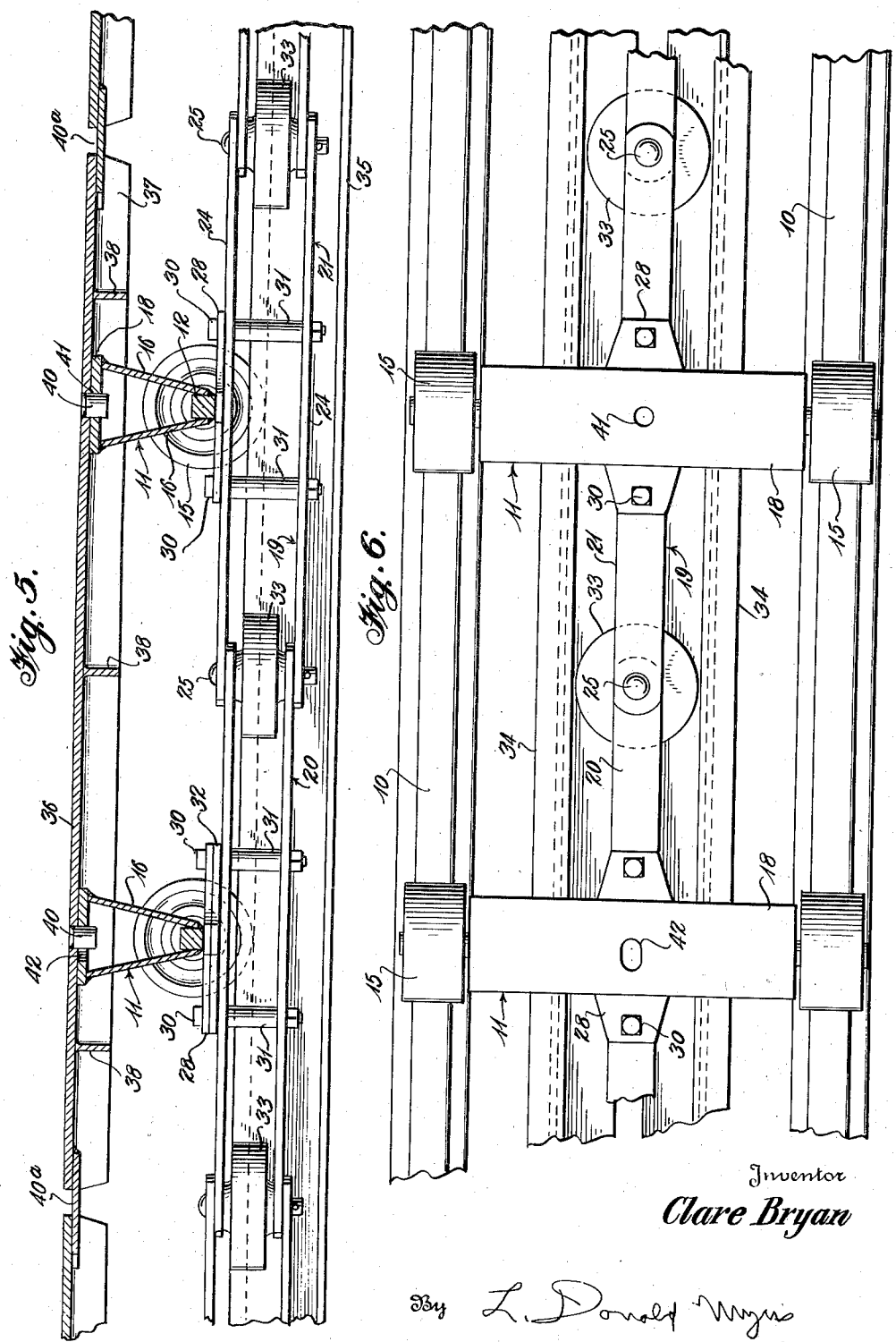

June 13, 1939.  C. BRYAN  2,162,419
MOLD CONVEYER
Filed March 4, 1938   4 Sheets-Sheet 4
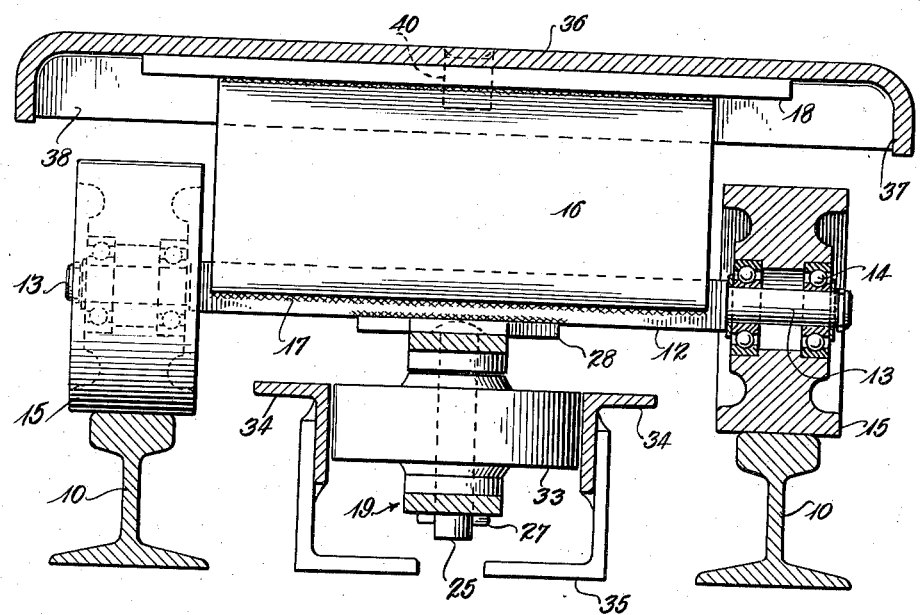
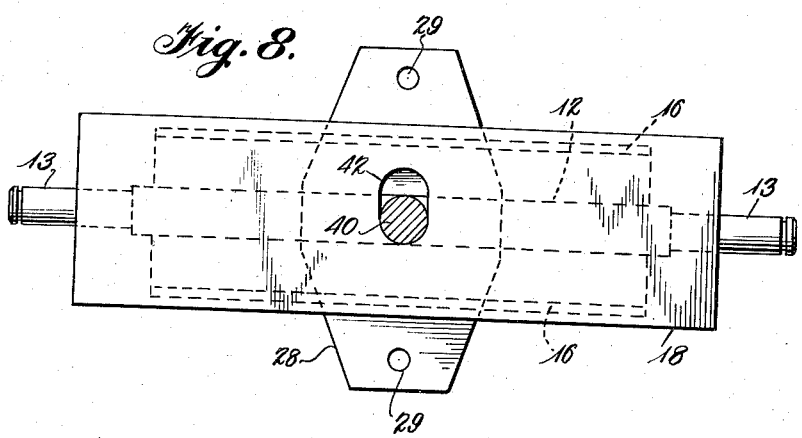
Inventor
Clare Bryan
By L. Donald Myers
Attorney

Patented June 13, 1939

2,162,419

UNITED STATES PATENT OFFICE

2,162,419

MOLD CONVEYER

Clare Bryan, Chicago, Ill., assignor to Link-Belt Company, a corporation of Illinois Application March 4, 1938, Serial No. 193,996

25 Claims. (Cl. 198—181)

This invention relates to new and useful improvements in conveyers of the type which is particularly adapted for use in conveying molds although its use need not necessarily be so limited.

The primary object of this invention is to provide a conveyer which is designed for moving molds through an endless horizontal path laid out in a casting or molding plant.

A further important object of the invention is to provide a conveyer of the above-mentioned type in which the top trays present a continuous mold carrying surface throughout both the straight runs and bends or curves and in which this continuous surface is supported by wheeled trucks located at uniformly spaced points throughout its entire length with the said trucks being positioned entirely beneath the trays so as to protect them from falling sand and other foreign material.

Another principal object of the invention is to unite the several load carrying trays by means of an endless chain which has associated therewith means for guiding the trays and their wheeled trucks throughout the entire horizontal path traveled by the same.

A still further object of the invention is to provide a conveyer of the above-mentioned type which is made up of a multiplicity of top trays each of which is adapted to have its weight and the weight of its load uniformly distributed between two wheeled trucks with means for moving both of the trucks relative to their trays to guide the latter through the desired horizontal path.

Still another object of the invention is to provide an endless chain for uniting and propelling the load carrying trays of a mold conveyer which is made up of a multiplicity of pivotally connected links each of which is independently supported by a wheeled truck and with means at both ends of each link for guiding the link and its wheeled truck through the desired path.

A further object of the invention is to provide a mold conveyer which is of an exceedingly simple, inexpensive and rugged design.

Other objects and advantages of the invention will be apparent during the course of the following description.

In the accompanying drawings forming a part of this specification and in which like numerals are employed to designate like parts throughout the same, Figure 1 is a side elevational view of a portion of the mold conveyer embodying this invention and illustrating the drive unit which is employed for propelling the conveyer, Figure 2 is an elevational view taken at right angles to Fig. 1, Figure 3 is a sectional plan view illustrating the manner in which the mold conveyer executes a turn or bend in its path of travel, Figure 4 is a horizontal sectional view taken on a plane located beneath the top load carrying trays and illustrates the manner in which the wheeled trucks are guided around the curved portion of the track on which the conveyer travels, Figure 5 is a detail view partly in vertical section and partly in side elevation disclosing one load carrying tray, its pair of wheeled trucks, and the manner in which the endless truck uniting and propelling chain is coupled with the trucks, Figure 6 is a plan view of a section of the mold conveyer with the top load carrying trays removed, Figure 7 is a detail vertical sectional view illustrating the construction of a wheeled truck, its association with a load carrying tray and the manner in which the wheels of the truck and a guide roller of the chain cooperate with their track rails and guide rails respectively, Figure 8 is a detail plan view illustrating the frame portion of the wheeled truck shown in detail in Fig. 7, and Figure 9 is a sectional view taken through one of the guide rollers associated with a pivotal connection between chain links.

In the drawings, wherein for the purpose of illustration is shown the preferred embodiment of this invention, the several figures, excepting 8 and 9, clearly illustrate the use of a pair of track rails 10 which are laid out in parallelism around a horizontal course or path which will cause the conveyer to properly serve the various units of a foundry, or the like. These track rails 10 are shaped to provide straight runs and lateral bends or curves.

Associated with the track rails 10 are a suitable number of wheeled trucks which are designated in their entirety by the reference character 11. The detail features of construction of these wheeled trucks will be understood by specifically referring to Figs. 5, 7 and 8.

Each truck includes a tranverse axle 12 which is provided with journals 13 at its opposite ends. Each one of these journals 13 has mounted thereon a pair of ball bearing units 14 employed for mounting a suitable wheel 15 which may be of the construction best illustrated in Fig. 7. These wheels 15 are supported by the axle 12 so as to properly register with the gauge of the track rails 10. It will be noted that the wheels 15 are of the flat periphery type; i. e., they are not provided with any guiding flanges.

To each side of the middle portion of the axle 12, the lower longitudinal edge of a frame side plate 16 is welded, as at 17. Fig. 5 clearly illustrates the fact that these two side plates 16 are positioned relative to each other so that they diverge vertically. The top longitudinal edges of these frame side plates 16 are suitably welded to the opposite longitudinal edges of a top bearing plate 18. This bearing plate extends longitudinally of and centrally overlies the axle 12. The bearing plate 18 is of greater length than the frame side plates 16 and overlies the wheels 15 at its opposite ends. As this bearing plate acts as a support for top load carrying trays, to be described at a later point, the length of the bearing plate 18 is important to provide stability for the trays.

The multiplicity of wheeled trucks 11 mounted on the track rails 10 are interconnected and uniformly spaced around the rails by an endless chain which is designated in its entirety by the reference character 19. This endless chain 19 is made up of a suitable number of inside links 20 and outside links 21, best shown in Fig. 5. All of these links are of the same pitch and are pivotally connected at their adjacent ends. Fig. 9 discloses in detail the manner in which these inside and outside links are pivotally connected. The inside links include parallel, spaced side bars 22 which are suitably connected at their opposite ends to a bushing 23, as by press fitting. The outside links are formed of side bars 24 which are connected at their opposite ends by a chain pin 25. This chain pin passes through the bore of the bushing 23 and is headed at its end 26 while a cotter pin 27 is associated with its remaining end.

Again referring to Figs. 5, 7 and 8, it will be seen that each one of the wheeled trucks 11 is provided with a mounting bracket 28 which is welded, or the like, to the middle portion of the axle 12. This mounting plate 28 extends transversely of the axle. The opposite ends of the mounting plate 28 are provided with apertures 29 for receiving bolts 30 which are employed to detachably connect the trucks with the middle portions of the inside and outside links 20 and 21 respectively of the endless chain. The mounting plates 28 are directly bolted to the outside faces of the top side bars 24 for the outside links 21. Suitable spacer sleeves 31 receive the portions of the bolts 30 which extend between the link side bars 24. The mounting plates 28 are connected to the inside links 20 in the same manner as that described in connection with the outside links 21 with the single exception that a shim or filler plate 32 must be provided to locate the mounting plate 28 for each inside link on the same plane as the mounting plate for the outside links. The same reference characters, therefore, will be applied to the additional elements associated with inside links 20 as were applied to these same elements which are associated with the outside links.

By inspecting Fig. 5, it will be seen that each one of the several links 20 and 21 has rigidly connected to its middle portion a wheeled truck 11. As all of the chain links are of the same pitch, this manner of associating the wheeled trucks with each one of the chain links uniformly spaces the trucks around the track rails 10. Each one of the wheeled trucks, also, is positioned midway between the pivotal connections between its associated link and the next adjacent links.

Fig. 9 clearly illustrates a roller 33 as being journaled on the bushing 23 of the pivotal connection between adjacent links. Figs. 4, 5 and 6 clearly illustrate each one of the pivotal connections between the chain links as being provided with one of these rollers 33. These rollers are to act as guide rollers for the wheeled trucks 11.

Cooperating with the guide rollers 33 is a pair of guide rails 34. Figs. 4, 5, 6 and 7 clearly illustrate these guide rails 34 as being positioned between the track rails 10 and substantially in the same plane as these rails. The guide rails 34 may be supported in any desired manner, but Fig. 7 illustrates a form of angle bracket 35 which may be used for this purpose. These guide rails 34 are suitably spaced to provide a slot or channel therebetween which is of suitable width to receive the guide rollers 33. As the guide rails 34 extend throughout the entire length of the track rails 10, the wheels 15 for the trucks 11 are at all times maintained on the rails 10 by the cooperation between the guide rollers 33 and the guide rails 34. In the straight runs of the rails 10, the guide rails 34 are centrally positioned between the track rails 10. To cause the truck wheels 15 to properly follow the curved portions of the track rails 10, the guide rails 34 must be bowed outwardly slightly from the centerline between the track rails 10. This outward bowing or offsetting of the guide rails 34 at a turn or bend is clearly illustrated in Fig. 4.

As each wheeled truck 10 is rigidly connected to the middle portion of a link and as a guide roller is associated with both ends of each link, guiding means are provided both in advance of and rearwardly of each wheeled truck. There is no possibility, therefore, of any of the wheeled trucks being permitted to run off of the track rails 10. Because of the constant guiding of the wheeled trucks by means of cooperating, vertically extending surfaces provided by the guide rollers 33 and the guide rails 34, it is impossible for sand and other foreign matter to accummulate on the rails in a manner to bring about derailment of any of the trucks. This arrangement, also, permits the entire load of the conveyer to be carried by the wheeled trucks and the track rails 10. The attachment of the endless chain 19 to the truck axles so that the chain, with its guiding rollers 33, depends from the wheeled trucks, lowers the center of gravity for the trucks, and further adds stability to the assembly.

The conveyer is made suitable for carrying molds, or the like, by mounting on the wheeled trucks 11 a suitable number of top carrying trays 36. The detail features of these trays 36 are best illustrated in Figs. 3, 5 and 7. These trays preferably are cast in one piece and are provided with the longitudinal side reinforcing flanges 37 and the transversely extending reinforcing webs 38. Fig. 3 discloses each load carrying tray 36 as being shaped diagonally at 39 to facilitate making turns at the ends of the straight runs of the conveyer. One end of each tray 36 is provided with a longitudinally extending apron 40 which bridges the gap between adjacent trays. These aprons function to prevent sand and other foreign matter from dropping between the trays onto the track and guide rails.

Figs. 3 and 5 clearly illustrate each of the trays 36 as being mounted on and independently supported by two wheeled trucks 11. Depending from each end portion of each tray 36 is a pin 40. By comparing Figs. 5 and 6, it will be seen that one of these pins 40 is received in a circular opening 41 formed in one of the wheeled trucks for the tray. The remaining pin 40 is received within an elongated opening 42 formed in the bearing plate 18 of the other truck for the tray. The pin and opening connection 40—41 establishes a drive connection between one end of the tray 36 and one of its wheeled trucks 11. This drive connection permits the truck to pivot relative to the tray. The pin and opening connection 40—42 between the other end of the tray and its remaining wheeled truck allows for a pivotal and relatively slidable movement between the tray and this truck.

The need for this pivotal and slidable connection between the tray and one of its trucks is clearly illustrated in Figs. 3 and 4. It will be appreciated that the pins 40 are connected to their tray 36 so that the distance between centers will remain constant. The pair of trucks 11 connected to the pins 40 for a tray are, however, connected to separate links of the chain 19 and these separate links are pivotally connected at a point midway between the two trucks. Therefore, as the guide roller 33 located between the two trucks of a tray is caused to travel between the portions of the guide rails 34 which are bowed outwardly of the centerline between the track rails 10 while executing a curve or bend, the straight line distance between the centers of the wheeled trucks is reduced or shortened. The tray pin 40 which is associated with the elongated opening 42, therefore, moves outwardly or longitudinally of this opening.

Figs. 1 and 2 disclose a drive unit which is employed for propelling the mold conveyer trays and their trucks around the rails. This drive unit includes a suitable skeleton frame which is designated in its entirety by the reference character 43. Suitably mounted on this skeleton frame are the sprocket wheels 44. A roller chain 45 is trained over the sprockets 44. At suitably spaced intervals along the length of the roller chain 45 are positioned driving dogs 46. These dogs are of hook shape so as to bear against the rear side of a guide roller 33 for the conveyer chain when traveling through the upper arm of the drive chain 45. These dogs are provided with suitable guide and supporting carriages 47 of the wheeled type. The wheels of these carriages are adapted to travel on the rails 48 and 49 associated with the lower and upper runs of the drive chain 45, as best illustrated in Fig. 1. The shaft 50, supporting the sprocket 44 at the right-hand end of Fig. 1, is the drive shaft which is illustrated in Fig. 2 as having a power applying member 51 properly mounted thereon. This member 51 is driven by the drive member 52 keyed to the output shaft 53 of a change speed gear unit 54 which is diagrammatically illustrated in Fig. 2. A suitable electric motor 55 is illustrated as driving the transmission unit 54.

It is believed that the above description, when considered with the various figures of the drawings, will enable one skilled in the art to fully appreciate the features of construction and mode of operation of this mold conveyer. It is believed to be advisable to call attention to certain outstanding features of the device.

It will be readily appreciated that this mold conveyer is of exceedingly simple and inexpensive construction. The provision of two wheeled trucks for each load carrying tray affords a very rugged construction which will endure hard usage and which will adapt the conveyer to handle heavy molds. The pins 40 for the various trays are connected to the wheeled trucks in such a manner that the trays may be lifted off of the trucks. The removal of the trays will permit the remainder of the conveyer to be readily cleaned and serviced. The wheeled trucks, the guide rollers and the track and guide rails are very effectively protected and shielded by the various trays 36 and their aprons 40 so that it will be impossible for sand and other foreign material to fall onto these elements in large quantities. As has been pointed out above, the wheeled trucks are very effectively guided and maintained on the load carrying track rails 10 by the type of endless chain and guide mechanism which is employed for connecting the various tray trucks.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a mold conveyer, or the like, a multiplicity of load carrying trays, a pair of wheeled trucks for each tray, and means exclusive of said trucks for uniting the trucks of each tray and of all of the trays, said means comprising a chain formed of a plurality of pivotally connected links and means for connecting one of said trucks to each one of said chain links between each pivotal chain connection.

2. In a mold conveyer, or the like, a multiplicity of load carrying trays, a pair of wheeled trucks for each tray, and means exclusive of said trucks for uniting the trucks of each tray and of all of the trays, said means comprising a chain formed of a plurality of pivotally connected links all of which have the same pitch, and means for rigidly connecting a wheeled truck to the middle portion of each of said links.

3. In a mold conveyer, or the like, a multiplicity of load carrying trays, a pair of wheeled trucks for each tray adapted to be supported upon a track, an endless chain comprising a plurality of pivotally connected links of uniform pitch, a guide roller journaled on each pivotal connection for said links, means for rigidly connecting the middle portion of each of said links to one of said trucks, and guide rails for said rollers positioned relative to said track so as to maintain the wheeled trucks resting on the track.

4. In a mold conveyer, or the like, a multiplicity of load carrying trays, a pair of wheeled trucks for each tray adapted to be supported on a track, an endless chain comprising a plurality of pivotally connected links of uniform pitch, means for suspending said endless chain from said wheeled trucks comprising a rigid connection between the middle of each link and one of said trucks, and guiding means associated with each end of each link whereby each truck is maintained on said track by the guiding means for both ends of its link.

5. In a mold conveyer, or the like, a multiplicity of load carrying trays, a pair of wheeled trucks individual to and completely underlying each tray, each of said trucks including an axle journaling wheels and a frame rigid with the axle and having a top bearing plate on which its tray rests, means comprising cooperating pins and openings for removably and pivotally connecting said truck frames to their trays and for interconnecting the pair of trucks for each tray through their tray, and an endless chain suspended from said trucks for driving the same and for connecting the pairs of trucks for the several trays.

6. In a mold conveyer, or the like, a multiplicity of load carrying trays, a pair of wheeled trucks for each tray, each of said trucks including an axle journaling wheels and a frame rigid with the axle and having a top bearing plate on which its tray rests, means comprising cooperating pins and openings for removably connecting said truck frames to their tray, and an endless chain suspended from said trucks for driving the same and for connecting the pairs of trucks of the several trays, said chain comprising a plurality of pivotally connected links and means for rigidly connecting one of the trucks to each link.

7. In a mold conveyer, or the like, a conveyer unit comprising a load carrying tray, a pair of wheeled trucks, each of said trucks including an anxle journaling wheels and a frame rigid with the axle and having a top bearing plate, means for drivingly and pivotally connecting the bearing plate of one of said trucks to the tray, means for pivotally and slidably connecting the bearing plate of the other of said trucks to the tray, a separate chain link rigidly connected to each one of said truck axles, and means for pivotally connecting the adjacent ends of said links.

8. In a mold conveyer, or the like, a conveyer unit comprising a load carrying tray, a pair of wheeled trucks, each of said trucks including an axle journaling wheels and a frame rigid with the axle and having a top bearing plate, means for drivingly and pivotally connecting the bearing plate of one of said trucks to the top tray, means for pivotally and slidably connecting the bearing plate of the other of said trucks to the tray, a separate chain link rigidly connected to each one of said truck axles, means for pivotally connecting the adjacent ends of said links, and a guide roller mounted on the pivotal connection between said links and at the remaining end of each of said links.

9. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be positioned between said guide rails, said chain consisting of a multiplicity of links equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks so as to space each one of said guide rollers equally between each adjacent pair of trucks, and load carrying trays mounted on said wheeled trucks.

10. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be positioned between said guide rails, said chain consisting of a multiplicity of links equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks so as to space each one of the guide rollers equally between each adjacent pair of trucks, and load carrying trays detachably and directly pivotally mounted on said wheeled trucks.

11. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be properly positioned between said guide rails, said chain consisting of a multiplicity of links equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks so as to space each one of the guide rollers equally between each adjacent pair of trucks, and an endless series of carrying trays mounted on said wheeled trucks with each tray being independently, pivotally supported by two trucks.

12. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be positioned between said guide rails, said chain consisting of a multiplicity of links of uniform pitch, equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks by having the middle portion of each link rigidly connected to a wheeled truck with the result that the guide rollers are each spaced equally between an adjacent pair of trucks, and a load carrying tray pivotally mounted on each two of said wheeled trucks.

13. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be positioned between said guide rails, said chain consisting of a multiplicity of links of uniform pitch, equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks by having the middle portion of each link rigidly connected to a wheeled truck with the result that the guide rollers are each spaced equally between an adjacent pair of trucks, an endless series of carrying trays mounted on said wheeled trucks with each tray being independently pivotally supported by two trucks.

14. In a mold conveyer, or the like, a conveyer unit comprising a load carrying tray, a pair of wheeled trucks, means for drivingly and pivotally connecting one of said trucks to the tray, means for pivotally and slidably connecting the other of said trucks to said tray, a separate chain link rigidly connected to each one of said trucks, and means for pivotally connecting the adjacent ends of said links.

15. In a mold conveyer, or the like, a conveyer unit comprising a load carrying tray, a pair of wheeled trucks, means for drivingly and pivotally connecting one of said trucks to the tray, means for pivotally and slidably connecting the other of said trucks to said tray, a separate chain link rigidly connected to each one of said trucks, means for pivotally connecting the adjacent ends of said links, and a guide roller journaled at the point of pivotal connection between said links and also at the remaining end of each of said links.

16. In a mold conveyer, or the like, a conveyer unit comprising a load carrying tray, a pair of wheeled trucks, means for drivingly and pivotally connecting one of said trucks to the tray, means for pivotally and slidably connecting the other of said trucks to said tray, a separate chain link of uniform length rigidly connected at its middle to each one of said trucks, and means for pivotally connecting the adjacent ends of said links.

17. In a mold conveyer, or the like, a pair of endless track rails, a pair of endless guide rails arranged between the track rails, a multiplicity of wheeled trucks mounted on said track rails, an endless chain connected to said trucks to uniformly space the same around the track rails and being suspended from the trucks so as to be positioned between said guide rails, said chain consisting of a multiplicity of links equal in number to that of the trucks and pivotally connected at their adjacent ends, a guide roller journaled on each pivotal connection for said chain links and adapted to bear against the guide rails to maintain the wheeled trucks on the track rails, the chain being associated with the wheeled trucks so as to space each one of said guide rollers equally between each adjacent pair of trucks, a load carrying tray individual to every two trucks positioned around the endless chain, means for drivingly and pivotally connecting each tray to one of said trucks, and means for pivotally and slidably connecting each tray to the other of its trucks.

18. In a mold conveyer, or the like, a pair of endless track rails, a pair of endless guide rails arranged between the track rails, a multiplicity of wheeled trucks mounted on said track rails, each of said trucks comprising a wheeled axle, a frame rigid with and overlying said axle and formed by upwardly diverging side plates directly attached to the axle with a top bearing plate joining the upper edges of the side plates, an endless chain consisting of a multiplicity of links equal in number to that of the trucks and pivotally connected at their adjacent ends, means for rigidly connecting one of said trucks to the middle portion of each one of said chain links so that the chain will be suspended from the trucks to be positioned between said guide rails, a guide roller journaled on each pivotal connection for said chain links and adapted to bear against the guide rails to maintain the wheeled trucks on the track rails, and load carrying trays mounted on said top bearing plates of the trucks.

19. In a mold conveyer, or the like, a pair of endless track rails, a pair of endless guide rails arranged between the track rails, a multiplicity of wheeled trucks mounted on said track rails, each of said trucks comprising a wheeled axle, a frame rigid with and overlying said axle and formed by upwardly diverging side plates directly attached to the axle with a top bearing plate, having an opening formed therein, joining the upper edges of the side plates, an endless chain consisting of a multiplicity of links equal in number to that of the trucks and pivotally connected at their adjacent ends, means for rigidly connecting one of said trucks to the middle portion of each one of said chain links so that the chain will be suspended from the trucks to be positioned between said guide rails, a guide roller journaled on each pivotal connection for said chain links and adapted to bear against the guide rails to maintain the wheeled trucks on the track rails, an endless series of load carrying trays resting on the top bearing brackets of said trucks, and a pair of pins carried by each tray and adapted to project into the openings of two truck top bearing plates.

20. In a mold conveyer, or the like, a conveyer unit comprising a load carrying tray, a pair of wheeled trucks, means for drivingly and pivotally connecting one of said trucks to the tray, means for pivotally and slidably connecting the other of said trucks to said tray, a separate chain link rigidly connected to each one of said trucks, means for pivotally connecting the adjacent ends of said links at approximately the longitudinal center of the load carrying tray, and a guide roller journaled at the point of pivotal connection between said links.

21. In a mold conveyer, or the like, a conveyer unit comprising a load carrying tray, a pair of wheeled trucks, means for drivingly and pivotally connecting one of said trucks to the tray, means for pivotally and slidably connecting the other of said trucks to said tray, a separate chain link rigidly connected to each one of said trucks, means for pivotally connecting the adjacent ends of said links at approximately the longitudinal center of the load carrying tray, and a guide roller journaled at the outer end of each one of said links.

22. In a mold conveyer, or the like, a multiplicity of load carrying trays, a pair of wheeled trucks for each tray, means exclusive of said trucks for uniting the trucks of each tray and of all of the trays, said means comprising a chain formed of a plurality of pivotally connected links, and means for connecting one of said trucks to each one of said chain links between each pivotal chain connection; and a guide roller journaled on each pivotal connection which joins the links that unite the pair of trucks for each tray.

23. In a mold conveyer, or the like, a multiplicity of load carrying trays, a pair of wheeled trucks for each tray, means exclusive of said trucks for uniting the trucks of each tray and of all of the trays, said means comprising a chain formed of a plurality of pivotally connected links, and means for connecting one of said trucks to each one of said chain links between each pivotal chain connection, and a guide roller journaled on each pivotal connection which joins the pairs of links that unite the pairs of trucks for adjacent trays.

24. In a mold conveyer, or the like, a multiplicity of load carrying trays, a pair of wheeled trucks for each tray, means for pivotally connecting each tray to its pair of wheeled trucks, means for slidably connecting each tray to one of its wheeled trucks, means exclusive of said trucks for uniting the trucks of each tray and of all of the trays, said means comprising a chain formed of a plurality of pivotally connected links, and means for connecting one of said trucks to each one of said chain links between each pivotal chain connection; and a guide roller journaled on each pivotal connection which joins the links that unite the pair of trucks for each tray.

25. In a mold conveyer, or the like, a multiplicity of load carrying trays, a pair of wheeled trucks for each tray, means for pivotally connecting each tray to its pair of wheeled trucks, means for slidably connecting each tray to one of its wheeled trucks, means exclusive of said trucks for uniting the trucks of each tray and of all of the trays, said means comprising a chain formed of a plurality of pivotally connected links, and means for connecting one of said trucks to each one of said chain links between each pivotal chain connection; and a guide roller journaled on each pivotal connection which joins the pairs of links that unite the pairs of trucks for adjacent trays.

CLARE BRYAN.